United States Patent [19]

Hedeen et al.

[11] Patent Number: 5,453,647
[45] Date of Patent: Sep. 26, 1995

[54] ELECTRIC MOTOR ASSEMBLY WITH MUFFLER BANK

[75] Inventors: Robert A. Hedeen, Clifton Park; Omer L. Ari, Troy, both of N.Y.; Len E. Stacy, Erie, Pa.

[73] Assignee: General Electric Company, Schenectady, N.Y.

[21] Appl. No.: 265,896

[22] Filed: Jun. 27, 1994

[51] Int. Cl.⁶ .......................... H02K 5/24; F02M 35/12; F01N 1/00
[52] U.S. Cl. .......................... 310/51; 181/202; 181/214; 181/240
[58] Field of Search ................. 310/51, 61; 181/198, 181/202, 214, 240, 241, 265

[56] References Cited

U.S. PATENT DOCUMENTS

| | | | |
|---|---|---|---|
| 3,612,216 | 10/1971 | Riedez | 181/53 |
| 4,336,791 | 6/1982 | Kitchhen | 126/110 R |
| 4,635,752 | 1/1987 | Jennings | 181/241 |
| 4,701,193 | 10/1987 | Robertson et al. | 55/217 |
| 5,124,600 | 6/1992 | Hedeen | 310/351 |
| 5,183,975 | 2/1993 | Craggs et al. | 181/202 |
| 5,327,036 | 7/1994 | Carey | 310/51 |

FOREIGN PATENT DOCUMENTS

| | | | |
|---|---|---|---|
| 2000236 | 10/1977 | Germany | 310/51 |
| 5187336 | 7/1993 | Japan | 181/214 |

OTHER PUBLICATIONS

McGraw–Hill Encyclopedia of Science and Technology, 7th Edition, vol. 1, 1992, pp. 66, 67 75–79, 82.
McGraw–Hill Encyclopedia of Science and Technology, 7th Edition, vol. 2, 1992, pp. 468–469.
Applicants' Statement of Facts.

*Primary Examiner*—Thomas M. Dougherty
*Attorney, Agent, or Firm*—Douglas E. Erickson; Paul R. Webb, II

[57] ABSTRACT

An electric motor assembly. An air-ventilated electric motor includes a motor housing having a cooling-air inlet and a cooling-air outlet. An outlet muffler array is located outside, and spaced apart from, the motor housing and includes two or more outlet mufflers each having a fluid entrance and a fluid exit. An outlet connecting duct has a first end connected to the cooling-air outlet of the motor housing and has a second end connected in parallel to the fluid entrances of each of the outlet mufflers. The assembly may also include an inlet muffler array and an inlet connecting duct.

3 Claims, 1 Drawing Sheet

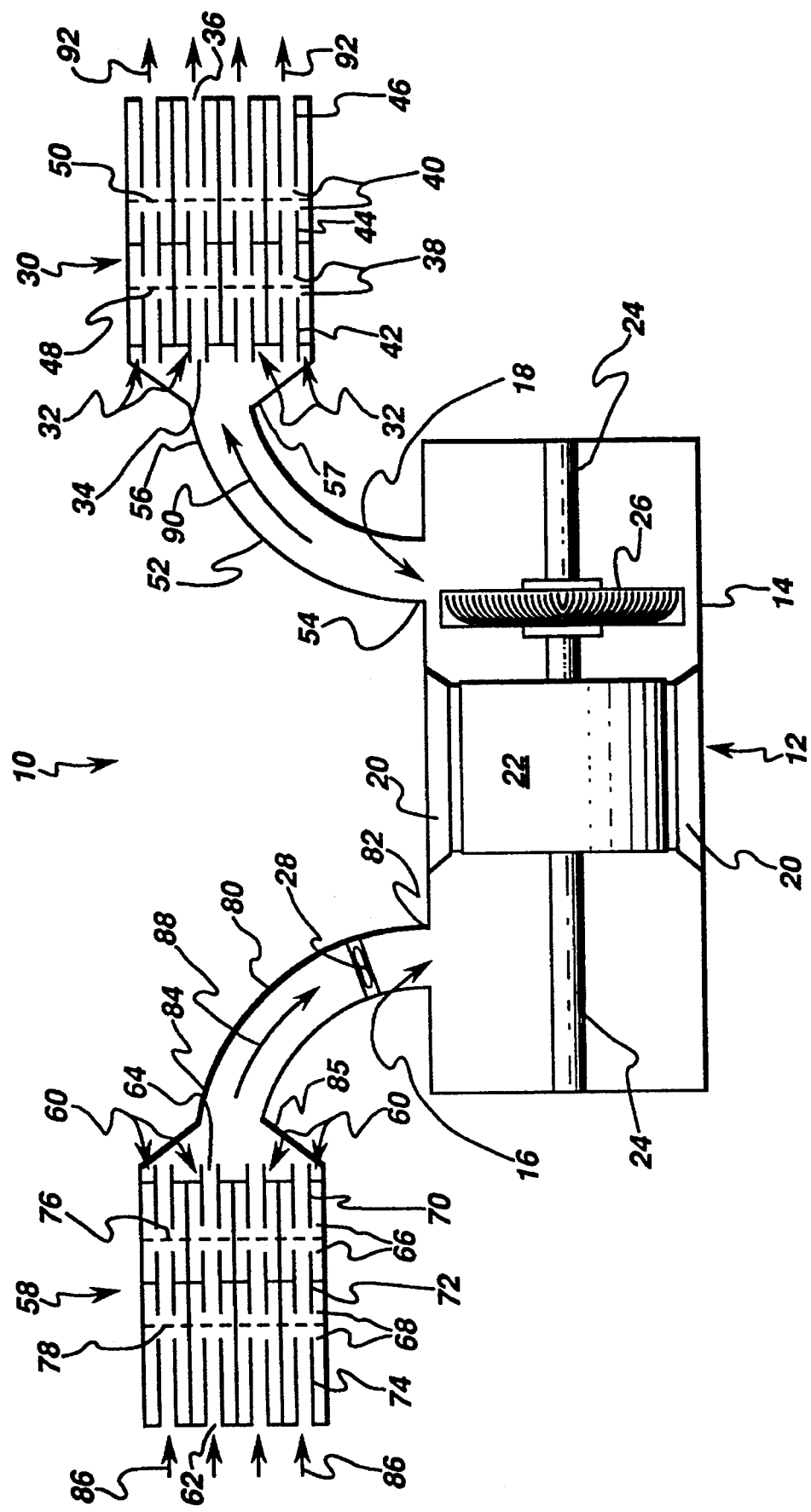

5,453,647

ELECTRIC MOTOR ASSEMBLY WITH MUFFLER BANK

BACKGROUND OF THE INVENTION

The present invention relates generally to an electric motor assembly which includes an air-ventilated electric motor, and more particularly to such an assembly which also includes an external muffler bank (i.e., an external muffler array) for attenuating electric motor ventilation noise.

Electric motors include large electric motors, such as industrial electric motors and transit vehicle electric motors, which must be air cooled. Such air-ventilated electric motors typically have fan blades attached to the rotor shaft inside the motor housing to pull cooling air across the rotor and through the stator windings or have an independent cooling fan outside the motor housing to push cooling air through the motor housing and across the rotor and through the stator windings contained therein. Such ventilation system of a large electric motor creates excessive broadband noise from the flow turbulence and excessive tonal noise from the fan blade passage and the rotor bar passage which poses a health and safety issue in both industrial settings and urban transit applications.

A known noise attenuation technique is to employ an integral silencer disposed within the motor housing of an air-ventilated electric motor having fan blades, such silencer including an expansion chamber and a resonating chamber which are two reactive muffler acoustic elements. Some electric-motor applications provide little space to expand the motor housing to include an integral silencer. What is needed is a noise attenuation technique for an air-ventilated electric motor which allows for greater flexibility in muffler design (i.e., in the size, shape, location, and tuning of the muffler acoustic elements) for maximum acoustic attenuation while minimizing any additional flow resistance caused by the presence of the muffler acoustic elements.

SUMMARY OF THE INVENTION

It is an object of the invention to provide an electric motor assembly having a muffler array (i.e., a muffler bank) located outside the housing of the air-ventilated electric motor.

In a first preferred embodiment, the electric motor assembly of the invention includes an air-ventilated electric motor, an outlet muffler array, and an outlet connecting duct. The motor includes a motor housing having a cooling-air inlet and a cooling-air outlet. The outlet muffler array is located outside, and spaced apart from, the motor housing and includes at least two outlet mufflers each having a fluid entrance and a fluid exit. The outlet connecting duct has a first end connected to the cooling-air outlet of the motor housing and has a second end connected in parallel to the fluid entrances of each of the outlet mufflers.

In a second preferred embodiment, the electric motor assembly of the invention includes an air-ventilated electric motor, an inlet muffler array, and an inlet connecting duct. The motor includes a motor housing having a cooling-air inlet and a cooling-air outlet. The inlet muffler array is located outside, and spaced apart from, the motor housing and includes at least two inlet mufflers each having a fluid entrance and a fluid exit. The inlet connecting duct has a first end connected to the cooling-air inlet of the motor housing and has a second end connected in parallel to the fluid exits of each of the inlet mufflers.

Several benefits and advantages are derived from the invention. Locating the muffler array (i.e., the muffler bank) outside the motor housing allows for increased size, shape, and number of the muffler acoustic elements making up each muffler in the muffler array with such muffler acoustic elements (such as, but not limited to, expansion chambers) being individually tuned to attenuate the noise spectrum, and particularly to attenuate specific dominating noise frequencies, of a particular electric motor. Having at least two (and preferably more) individual mufflers connected in parallel to the connecting duct reduces the flow resistance to air through the muffler array, and the number of individual mufflers which make up the muffler array may be chosen so as to minimize such resistance, as can be appreciated by those skilled in the art.

BRIEF DESCRIPTION OF THE DRAWINGS

The accompanying drawing illustrates a preferred embodiment of the present invention wherein:

the Figure is a schematic view of the electric motor assembly of the invention.

DETAILED DESCRIPTION OF THE INVENTION

Referring now to the drawing, the Figure schematically shows the electric motor assembly 10 of the present invention. The electric motor assembly 10 includes an air-ventilated electric motor 12 including a motor housing 14 having a cooling-air inlet 16 and a cooling-air outlet 18. The electric motor 12 further includes a stator 20 spaced apart from and circumferentially surrounding a rotor 22 which is fixedly connected to a shaft 24 which is rotatably attached to the motor housing 14.

The air-ventilated electric motor 12 typically would be a large electric motor used in a noise-sensitive application, such as an industrial electric motor operating near people or an electric motor providing locomotion for an urban transit vehicle such as a trolley, a train, a monorail, etc. The air ventilation of such an electric motor 12 is needed to prevent motor overheating. In one embodiment, seen in the Figure, air ventilation is provided by having the electric motor assembly 10 include a row of fan blades 26 disposed within the motor housing 14 and attached to the shaft 24 between the rotor 22 and the cooling-air outlet 18 of the motor housing 14. In another embodiment, also seen in the Figure, air ventilation is provided by a separate cooling fan 28 disposed outside the motor housing 14 and in upstream fluid communication with the cooling-air inlet 16 of the motor housing 14. Typically, the air ventilation of the electric motor 12 would be provided by either the row of fan blades 26 or by the separate cooling fan 28 and not by both.

The electric motor assembly 10 additionally includes an outlet muffler array 30 (i.e., an outlet muffler bank) which is disposed outside, and spaced apart from, the motor housing 14. The outlet muffler array 30 includes a plurality of outlet mufflers 32 each having a fluid entrance 34 and a fluid exit 36. Preferably, the outlet mufflers 32 are generally identical to and generally aligned with each other, and any one of the outlet mufflers abuts at least one other of the outlet mufflers. It is noted that four outlet mufflers 32 make up the outlet muffler array 30 shown in the Figure. In an exemplary embodiment, each of the outlet mufflers 32 includes at least two (and preferably more) reactive muffler acoustic elements. A reactive muffler acoustic element is defined to be a chamber (such as chamber 38 or chamber 40), a pipe (such as pipe 42, pipe 44, or pipe 46), or a screen (such as screen 48 or screen 50), with a chamber acting as an electric capacitor, with a pipe acting as an electrical inductor, and with a screen acting as a resistor in an analogous impedance-type electrical circuit, as is known to those skilled in the art. Chambers include, but are not limited to, expansion and resonating chambers. Screens include, but are not limited to, perforated plates and perforated portions of pipes. The desired number of outlet mufflers 32 for the outlet muffler array 30 and the desired combination of reactive muffler acoustic elements 38–50 for each outlet muffler 32, as well as their desired size, shape, and orientation, is left to the artisan to tune each outlet muffler 32 to attenuate, to desired levels and spectrum, the excessive broadband and tonal noise from the ventilation system of a particular electric motor 12. It is noted that the reactive muffler acoustic elements 38–50 may also be lined with acoustic absorbing materials (not shown in the figure).

The electric motor assembly 10 moreover includes an outlet connecting duct 52 having a first end 54 connected to the cooling-air outlet 18 of the motor housing 14 and having a second end 56 connected in parallel (via a manifold 57) to the fluid entrances 34 of each of the outlet mufflers 32.

In an exemplary embodiment, the electric motor assembly 10 additionally includes an inlet muffler array 58 (i.e., an inlet muffler bank) which is disposed outside, and spaced apart from, the motor housing 14. The inlet muffler array 58 includes a multiplicity of inlet mufflers 60 each having a fluid entrance 62 and a fluid exit 64. Preferably, the inlet mufflers 60 are generally identical to and generally aligned with each other, and any one of the inlet mufflers abuts at least one other of the inlet mufflers. It is noted that four inlet mufflers 60 make up the inlet muffler array 58 shown in the Figure. In an exemplary embodiment, each of the inlet mufflers 60 includes at least two (and preferably more) reactive muffler acoustic elements. As previously stated, a reactive muffler acoustic element is defined to be a chamber (such as chamber 66 or chamber 68), a pipe (such as pipe 70, pipe 72, or pipe 74), or a screen (such as screen 76 or screen 78), with a chamber acting as an electric capacitor, with a pipe acting as an electrical inductor, and with a screen acting as a resistor in an analogous impedance-type electrical circuit, as is known to those skilled in the art. Chambers include, but are not limited to, expansion and resonating chambers. Screens include, but are not limited to, perforated plates and perforated portions of pipes. The desired number of inlet mufflers 60 for the inlet muffler array 58 and the desired combination of reactive muffler acoustic elements 66–78 for each inlet muffler 60, as well as their desired size, shape, and orientation, is left to the artisan to tune each inlet muffler 60 to attenuate, to desired levels and spectrum, the excessive broadband and tonal noise from the ventilation system of a particular electric motor 12. It is noted that the reactive muffler acoustic elements 66–78 may also be lined with acoustic absorbing materials (not shown in the figure).

Preferably, the inlet muffler array 58 is generally identical to the outlet muffler array 30. Thus, each inlet muffler 60 is generally identical to each outlet muffler 32, and each reactive muffler acoustic element 66–78 of an inlet muffler 60 is generally identical to the corresponding reactive muffler acoustic element 38–50 of an outlet muffler 32. It is noted that the inlet and outlet muffler arrays 58 and 30 are connected to the motor housing 14 such that the airflow in the inlet muffler array 58 is in the opposite direction to the airflow in the outlet muffler array 30. Thus, what is called a fluid entrance 62 of an inlet muffler 60 is called a fluid exit 36 of an outlet muffler 32, and what is called a fluid exit 64 of an inlet muffler 60 is called a fluid entrance 34 of an outlet muffler 32.

The electric motor assembly 10 moreover includes an inlet connecting duct 80 having a first end 82 connected to the cooling-air inlet 16 of the motor housing 14 and having a second end 84 connected in parallel (via a manifold 85) to the fluid exits 64 of each of the inlet mufflers 60.

In operation, for an urban transit vehicle (not shown in the figure), the outlet muffler array 30 and the inlet muffler array 58 are each disposed outside and away from the air-ventilated electric motor 12 in a convenient location in a less crowded area of the vehicle. Cooling air is either pushed into the cooling-air inlet 16 of the motor housing 14 by the separate cooling fan 28 or is pulled into the cooling-air inlet 16 of the motor housing 14 by the row of fan blades 26. Such cooling air starts as ambient air (shown by arrows 86) which is pulled into the fluid entrances 62 of the inlet mufflers 60 of the inlet muffler array 58. After leaving the inlet muffler array 58, such cooling air becomes inlet duct air (shown by arrow 88) within the inlet connecting duct 80. After cooling the electric motor 12 and leaving the motor housing 14, such cooling air becomes outlet duct air (shown by arrow 90) within the outlet connecting duct 52. The cooling air leaves the outlet muffler array 30 as discharge air (shown by arrows 92). The noise of the electric motor 12 including its separate cooling fan 28 and/or row of fan blades 26, is carried through the outlet connecting duct 52 and the inlet connecting duct 80 where some of it is reflected back by the outlet mufflers 32 (due to their reactive muffler acoustic elements 38–50) and the inlet mufflers 60 (due to their reactive muffler acoustic elements 66–78), while some of the noise is absorbed (i.e., converted to heat energy) by acoustic absorbing materials (not shown in the figure) within the outlet and inlet mufflers 32 and 60. Such reflecting back of the noise (caused by the impedance mismatch of the reactive muffler acoustic elements 38–50 and 66–78 with the acoustic energy generated by the separate cooling fan 28 and/or the row of fan blades 26 which prevents a portion of the acoustic energy from exiting the outlet and inlet mufflers 32 and 60) and such acoustic absorbing materials attenuate the noise heard outside the electric motor assembly 10. It is noted that depending on the particular application, the electric motor assembly 10 may have only an outlet muffler array 30, only an inlet muffler array 58, or both an outlet and an inlet muffler array 30 and 58.

Each outlet muffler 32 attenuates a certain fraction of the noise in the air stream passing through it, regardless of the number of outlet mufflers 32 in the outlet muffler array 30. The outlet mufflers 32 are arranged in parallel in order to minimize the flow resistance presented to the air stream. Each outlet muffler 32 presents a certain acoustic-mechanical impedance to the air stream. The analogous alternating current (AC) impedance, which is both resistive and reactive, reflects the acoustic power back upstream, reducing the transmitted noise. The analogous direct current (DC) resistance restricts the free flow of air and creates a pressure drop across the outlet muffler 32 in much the same way that an electrical resistor creates a voltage drop by restricting the current. This incremental pressure drop can have serious consequences in the ventilation (i.e., cooling) of a large electrical motor under load. Effective reactive muffler acoustic elements 38–50 generally require a cross section that is small (perhaps a tenth) compared to the acoustic wavelength of the highest frequency of interest. For a noise spectrum containing significant high frequency components, this leads to small diameter pipes, etc. with substantial flow resistance.

The effective resistance of an outlet muffler array 30 is equal to the resistance of a single outlet muffler 32 divided by the square of the number of outlet mufflers 32. Thus, the resistance presented to the air stream may be lowered to any desired value by adding enough parallel outlet mufflers 32 consistent with physical constraints. The same discussion holds true for the inlet mufflers 60.

The manifolds 57 and 85 and the connecting ducts 52 and 80 serve principally to transport the air stream to or from the corresponding muffler array 30 or 58. Their shape and size are largely immaterial and dependent on the available geometry of connection. They should have a characteristic cross section large enough so that they do not impede the flow of air and do not contribute to the noise attenuation by acting as reactive muffler acoustic elements themselves. The connecting ducts 52 and 80, for example, may be made of flexible material in order to fit around possible obstructions between the electric motor 12 and the muffler arrays 30 and 58, allowing greater leeway in the location of the muffler arrays 30 and 58. The manifolds 57 and 85, the connecting ducts 52 and 80, and the reactive muffler acoustic elements 38–50 and 66–78 should be made of a heavy material with sufficient sound transmission loss so that the fan noise all passes through the muffler arrays 30 and 58 to be attenuated, and does not pass directly through the walls of the muffler arrays 30 and 58, the manifolds 57 and 85, or the connecting ducts 52 and 80.

Applicants constructed a particular outlet and inlet muffler array 30 and 58 and a particular outlet and inlet connecting duct 52 and 80 for an urban transit vehicle having a particular air-ventilated electric motor 12 similar to that shown in the Figure. Applicants tuned such muffler arrays 30 and 58 for the particular application. Applicants performed tests showing that the excessive broadband noise and the excessive narrowband tonal noise from the ventilation system of such an electric motor 12 was attenuated by 7 decibels which is better than the predicted attenuation for the same electric motor having a known integral silencer. Such test demonstrated the effectiveness of the present invention. It is noted that the outlet and inlet muffler arrays 30 and 58 remove the pressure fluctuations at certain frequencies which are perceived as noise while allowing the mean air flow to pass with some small resistance to the atmosphere, and it is noted that the air passes all the outlet mufflers 32 in parallel and the air passes all the inlet mufflers 60 in parallel.

The foregoing description of several preferred embodiments of the invention has been presented for purposes of illustration. It is not intended to be exhaustive or to limit the invention to the precise form disclosed, and obviously many modifications and variations are possible in light of the above teaching. For example, the invention may include two outlet muffler arrays and two outlet connecting ducts. It is intended that the scope of the invention be defined by the claims appended hereto.

We claim:

1. An electric motor assembly comprising:

a) an air-ventilated electric motor including a generally hermetically-sealed motor housing having a cooling-air inlet and a cooling-air outlet;

b) an outlet muffler array disposed outside, and spaced apart from, said motor housing and including a plurality of outlet mufflers each having a fluid entrance and a fluid exit;

c) an outlet connecting duct having a first end generally hermetically connected to said cooling-air outlet of said motor housing and having a second end generally hermetically connected in parallel to said fluid entrances of each of said outlet mufflers, wherein said outlet mufflers are generally identical to and generally aligned with each other and wherein each of said outlet mufflers includes at least two reactive muffler acoustic elements;

d) an inlet muffler array disposed outside, and spaced apart from, said motor housing and including a multiplicity of inlet mufflers each having a fluid entrance and a fluid exit; and e) an inlet connecting duct having a first end generally hermetically connected to said cooling-air inlet of said motor housing and having a second end generally hermetically connected in parallel to said fluid exits of each of said inlet mufflers.

2. The electric motor assembly of claim 1, wherein said inlet mufflers are generally identical to and generally aligned with each other.

3. The electric motor assembly of claim 2, wherein said inlet muffler array is generally identical to said outlet muffler array.

* * * * *